(12) United States Patent
Moro et al.

(10) Patent No.: US 6,294,749 B1
(45) Date of Patent: Sep. 25, 2001

(54) WIRE ELECTRICAL DISCHARGE MACHINE

(75) Inventors: Toshio Moro; Seiji Satou, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/567,425

(22) Filed: May 10, 2000

Related U.S. Application Data

(63) Continuation of application No. PCT/JP98/04056, filed on Sep. 10, 1998.

(51) Int. Cl.$^7$ .................................................. B23H 7/10
(52) U.S. Cl. .................................................. 219/69.12
(58) Field of Search .................................... 219/69.12

(56) References Cited

U.S. PATENT DOCUMENTS

| | | | |
|---|---|---|---|
| 4,564,431 | * | 1/1986 | Miyano ............................. 219/69.12 |
| 4,629,854 | * | 12/1986 | Inoue et al. ....................... 219/69.12 |
| 4,707,580 | * | 11/1987 | Aso et al. ......................... 219/69.12 |
| 5,268,552 | * | 12/1993 | Onzuka et al. .................... 219/69.12 |
| 5,605,638 | * | 2/1997 | Fujita .............................. 219/69.12 |
| 6,150,626 | * | 11/2000 | Moro et al. ....................... 219/69.12 |

FOREIGN PATENT DOCUMENTS

| | | | |
|---|---|---|---|
| 61-182725 | | 8/1986 | (JP) . |
| 62-44320 | * | 2/1987 | (JP) .............................. 219/69.12 |
| 4-41126 | | 2/1992 | (JP) . |

OTHER PUBLICATIONS

International Search Report.

* cited by examiner

Primary Examiner—Geoffrey S. Evans
(74) Attorney, Agent, or Firm—Sughrue, Mion, Zinn, Macpeak & Seas, PLLC

(57) ABSTRACT

A wire electrical discharge machine including a wire electrode for processing a workpiece while causing electrical discharge to take place with a working fluid interposed between the wire electrode and the workpiece, and an upper wire guide and a lower wire guide through which the wire electrode is passed and which have therein channels for the working fluid to flow therethrough, including: a working fluid nozzle fixed to a guide body portion and adapted to jet and supply the working fluid toward the workpiece; an electric supply die provided in the working fluid nozzle to energize the wire electrode by coming into contact therewith; a recessed portion for engagement with the wire electrode being provided in a surface of the electric supply die along a moving direction of the wire electrode; and a plurality of jetting ports for jetting the working fluid toward the wire electrode so as to press the wire electrode against the electric supply die.

2 Claims, 6 Drawing Sheets

WIRE ELECTRICAL DISCHARGE MACHINE

This application is a continuation of PCT/JP98/04056 filed Sep. 10, 1998.

BACKGROUND OF THE INVENTION

1. Field of the Invention

The present invention relates to improvements in a wire electrical discharge machine for supplying electricity to a wire electrode traveling in an upper or lower wire guide section.

2. Description of the Related Art

A conventional wire electrical discharge machine will be described with reference to FIGS. 6 and 7. In FIGS. 6 and 7, the wire electrical discharge machine is comprised of a bed 1 serving as a base; a table 5 for fixing a workpiece 3 which is processed by a wire electrode 2; a processing tank 7 in which a working fluid is stored; an X-axis driving section 13 for moving the table 5 in an X-axis direction by moving an X-axis table 9 by driving an X-axis motor 8; a Y-axis driving section 17 for moving the table 5 in a Y-axis direction by causing a column 19 to move along a longitudinal direction of a lower arm 20 fixed to the base 1, by driving a Y-axis motor 15; a Z-axis driving section 21 for moving the table 5 in a Z-axis direction and fixed to the column 19; a lower wire guide 25 fixed to the lower arm 20 via an insulating plate on a vertical surface of a distal end of the lower arm 20; an upper wire guide 30 fixed to a distal end portion of the Z-axis driving section 21 so as to guide the wire electrode 2; an electric supply section 60 incorporated in the upper wire guide 30 so as to supply electricity to the wire electrode 2; and a feeding/collecting section for feeding and collecting the wire electrode 2.

The upper wire guide 30 allows the working fluid to flow to the workpiece 3 while guiding the wire electrode 2, and is arranged such that an upper end portion of a guide body portion 33 having a collar is engaged with and fixed to a guide attaching plate 31 which has a channel for supplying the working fluid to the workpiece 3 and a guide hole for passing the wire electrode 2 therethrough. A hollow cylindrical portion for guiding the wire electrode 2 is provided in the guide body portion 33. In this cylindrical portion, a cooling hole 33x for allowing the working fluid for cooling the wire electrode to flow in its interior is provided, and as a central hole of a rectifying plate 35 having a plurality of holes 35a for the working fluid to flow therethrough is engaged with and fixed to an outer peripheral surface of the cylindrical portion, a pool 36 is formed between a channel outlet of the guide attaching plate 31 and the holes 35a of the rectifying plate 35.

A lower auxiliary guide 38 for guiding the wire electrode 2 is fixed in the interior of a lower portion of the guide body portion 33, and an upper auxiliary guide 39 is also fixed in the interior of an auxiliary plate 37 fixed to an upper portion of the guide attaching plate 31. It should be noted that the guide attaching plate 31 and the auxiliary plate 39 are fixed to an upper block 41.

A jet nozzle 40 for guiding the wire electrode 2 into a guide hole in the lower wire guide 25 by means of the fluid has its outer peripheral surface fixed to an inner peripheral surface of the rectifying plate 35, and has a collar whose top surface is fixed to a holding portion 35b of the rectifying plate 35 via a spring 45, the jet nozzle 40 and the like being covered with a working fluid nozzle 47. The arrangement provided is such that the tip of the jet nozzle 40 returns to avoid contact with the workpiece 3 as the spring 45 is compressed by the pressure of the fluid to lower the tip of the jet nozzle 40 and stop the supply of the working fluid. It should be noted that a pipe 50 for the jet nozzle 40 and a pipe 55 for the working fluid nozzle 47 are connected to inlet ports of the guide attaching plate 31. In addition, since the basic configuration of the lower wire guide is identical to that of the upper wire guide, a description thereof will be omitted.

The electric supply section 60 is comprised of an electric supply die 62 for supplying electricity to the wire electrode 2, a die holding plate 64 for fixing this electric supply die 62 and pressing it toward the wire electrode 2 side, and a drawer plate 66 capable of inserting or withdrawing the electric supply die 62, the electric supply die 62 being electrically connected to an unillustrated power source.

The wire electrode feeding/collecting section is arranged such that the wire electrode 2 passes through a pipe 89 and is accommodated in a collecting box 90 by means of rollers 83, 85, and 87 for changing the direction of the wire electrode 2 wound around a wire bobbin 80.

Referring to FIGS. 6 and 7, a description will be given of the operation of the wire electrical discharge machine having the above-described construction. First, when the working fluid is supplied to the pipe 50, the jet nozzle 40 moves downward under the pressure of the working fluid while pressing the spring 45, and a jet stream jets out from a jetting hole 40a of the jet nozzle 40, which in turn causes the wire electrode 2 to pass through the interior of this jet stream and guides the wire electrode 2 to the lower wire guide 25, connecting the wire electrode 2 thereto.

During processing, the working fluid from the pipe 50 is stopped, which in turn causes the jet nozzle 40 to return upward by means of the spring 45, and the working fluid from the pipe 55 passes through the channel inside the guide attaching plate 31, the curving and the like of the fluid due to the occurrence of turbulence being alleviated by means of the pool 36. The working fluid then passes through the holes 35a in the rectifying plate 35 for stabilizing the direction in which the working fluid jets out from a jetting hole 47a of the working fluid nozzle 47, and the working fluid jets out from the jetting hole 47a.

Meanwhile, the wire electrode 2 is energized by the unillustrated power source through the electric supply die 62. At the same time, since a large current flows across the contacting portions of the electric supply die 62 and the wire electrode 2, and intense heat is produced therein, the working fluid is supplied from the cooling hole 33x to a wire passage 31a by being raised upward by means of the back pressure inside the working fluid nozzle 47, and passes the contacting portions, thereby absorbing Joule heat produced in the contacting portions. Accordingly, processing is continued while maintaining the contacting portions at a substantially fixed temperature. It should be noted that the electric supply die in the lower guide is also cooled by similar action.

Electrical discharge between the workpiece 3 and the wire electrode 2 is continued, and while the table 5 is being moved along the X-, Y-, and Z-axes by moving the X-axis driving section 17, the Y-axis driving section 19, and the Z-axis driving section 21, the high-speed working fluid from the working fluid nozzle 47 is supplied to a gap between the workpiece 3 and the working fluid nozzle 47 (hereafter referred to as the gap between the electrodes), thereby discharging and removing the processing sludge produced in the gap between the electrodes. While electrical discharge is continued in a state in which a proper gap is maintained between the electrodes and the resistance value is maintained to a fixed value, processing is continued.

However, with the electrical discharge machine having the above-described construction, as the wire electrode 2 travels while vibrating at its portion of contact with the electric supply die 62, noncontacting portions are produced and very small arc discharge occurs at the noncontacting portions. Accordingly, the surface of the electric supply die 62 becomes roughened, and the wire electrode 2 which is softer than the electric supply die 62 becomes eroded, thereby producing wire dust. Moreover, also in the electric supply die of the lower wire guide, the surface of the electric supply die which passed after machining becomes roughened due to discharge craters, exhibiting the aforementioned action more noticeably. As a means for preventing such a phenomenon, it is conceivable to move the position of the electric supply die 62 forward with respect to the wire electrode 2 so as to enlarge the frictional resistance due to contact with the wire electrode 2. However, there is a problem in that mechanical contact wear increases, and the wire electrode 2 is more liable to be eroded.

In the cooling of the electric supply die 62, the working fluid is supplied from the cooling hole 33x to the contacting portions by means of the back pressure of the interior of the nozzle. However, if the working nozzle and the workpiece become spaced apart from each other, the back pressure cannot be obtained sufficiently, making it impossible to supply the working fluid sufficiently to the contacting surface of the electric supply die 62. In particular, if the working current becomes large, the Joule heat at the contact energizing portion becomes large. Hence, the temperature rise increases, the wire electrode 2 is eroded, so that an irregular surface is produced on the surface, and a large quantity of dust is produced. Therefore, the wire electrode 2 possibly becomes disconnected when it vibrates at the irregular surface, the supply of current becomes unstable, and the passage of the wire electrode 2 becomes loaded with the dust. For this reason, there has been a problem in that machining must be effected by lowering the machining speed of the workpiece 3.

SUMMARY OF THE INVENTION

The present invention has been made to overcome the above-described problems, and its object is to provide a wire electrical discharge machine which is capable of sufficiently cooling the contacting portions of the electric supply die and the wire electrode while causing the wire electrode to travel smoothly.

To attain this object, according to the invention, there is provided a wire electrical discharge machine comprising: a wire electrode for processing a workpiece while causing electrical discharge to take place with a working fluid interposed between the wire electrode and the workpiece; an upper wire guide and a lower wire guide through which the wire electrode is passed and which have therein channels for the working fluid to flow therethrough; a working fluid nozzle fixed to the upper wire guide or the lower wire guide and adapted to jet and supply the working fluid toward the workpiece; an electric supply die provided in the working fluid nozzle to energize the wire electrode by coming into contact therewith; a recessed portion for engagement with the wire electrode being provided in a surface of the electric supply die along a moving direction of the wire electrode; and jetting means for jetting the working fluid toward the wire electrode so as to press the wire electrode against the electric supply die.

DETAILED DESCRIPTION OF THE PREFERRED EMBODIMENT

Next, a description will be given hereafter of an embodiment of the present invention.

Figure 1:
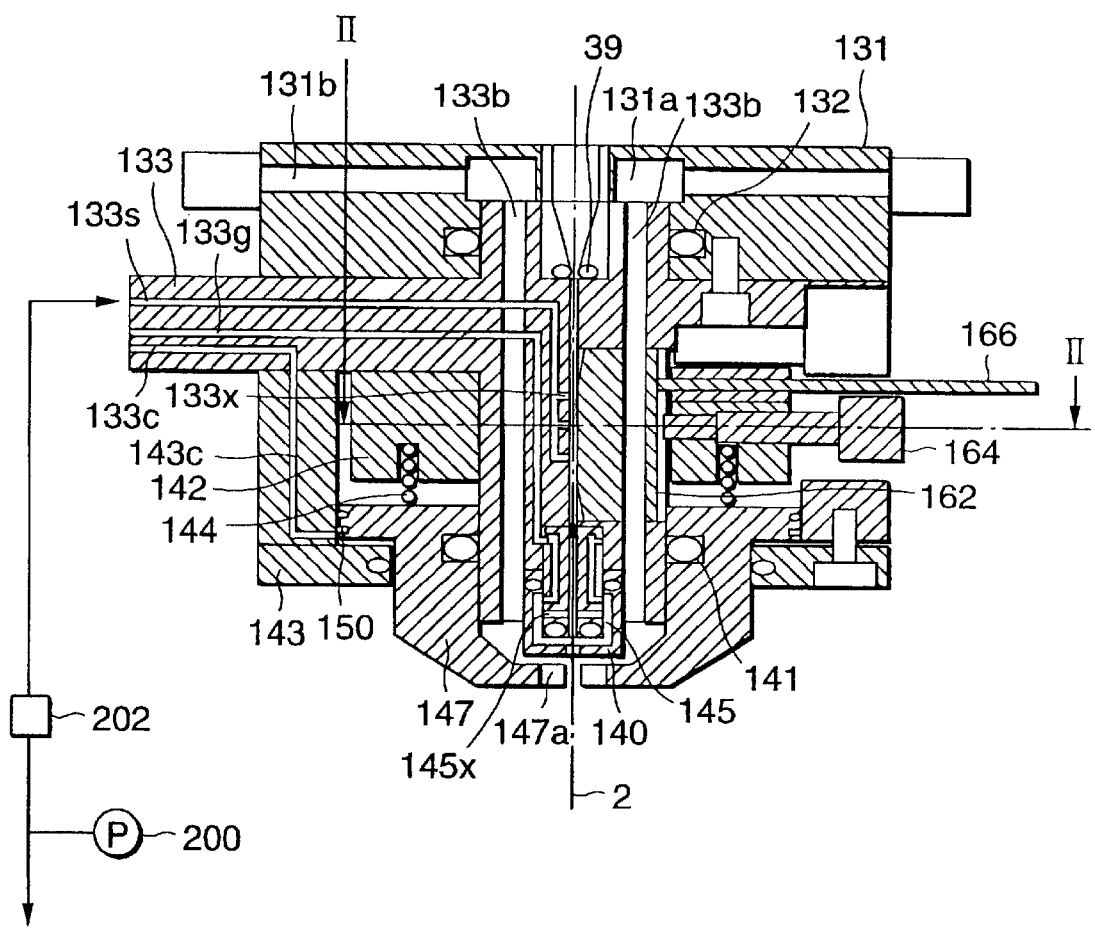
FIG. 1 is a cross-sectional view of an upper wire guide according to an embodiment of the present invention.
Figure 2:
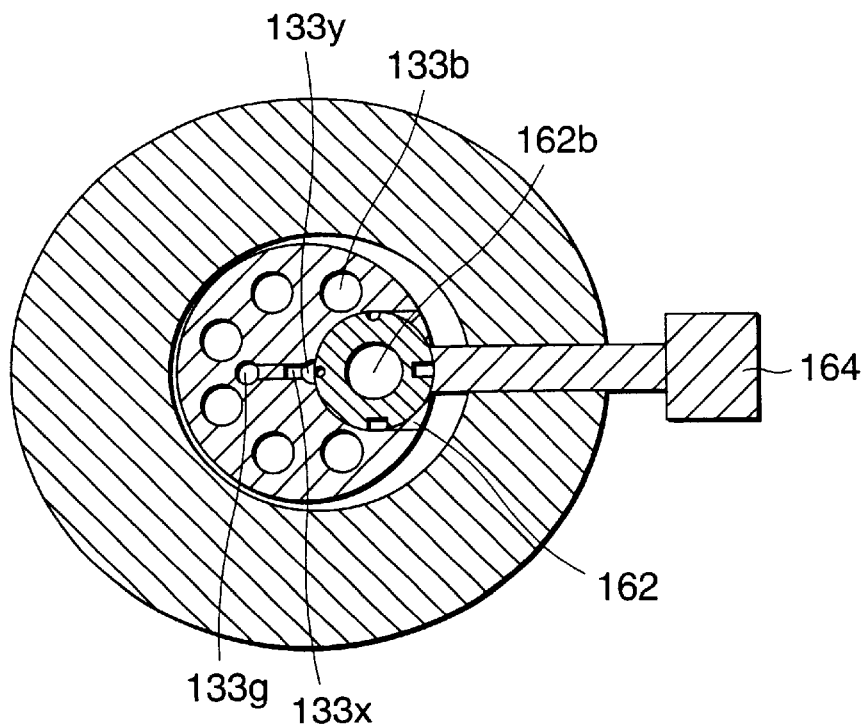
FIG. 2 is a cross-sectional view, taken along line II—II in the direction of arrows, of an electric supply die and a guide body portion shown in FIG. 1.
Figure 3:
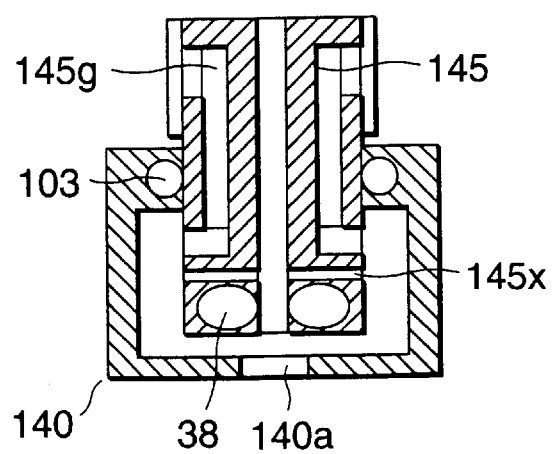
FIG. 3 is a cross-sectional view of a jet nozzle shown in FIG. 1.
Figure 4A:
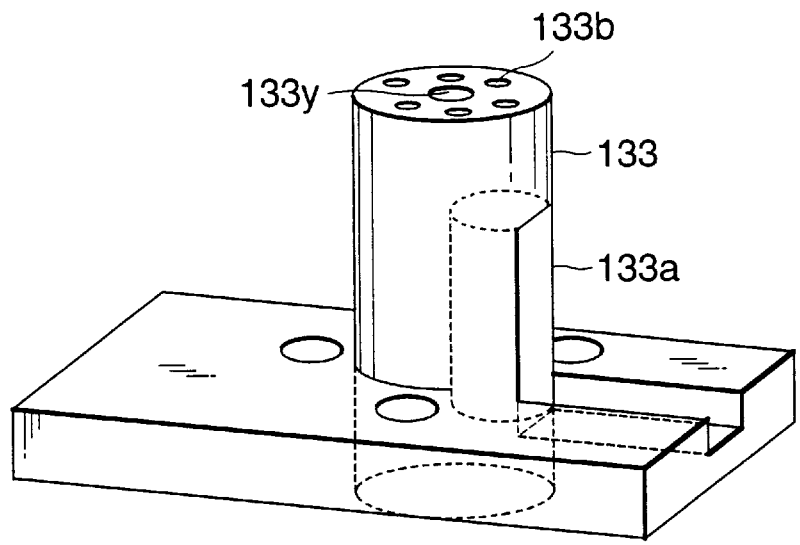
FIGS. 4A and 4B are perspective views and a cross-sectional view of an electric-supply-die receiving member shown in FIG. 1.
Figure 4B:
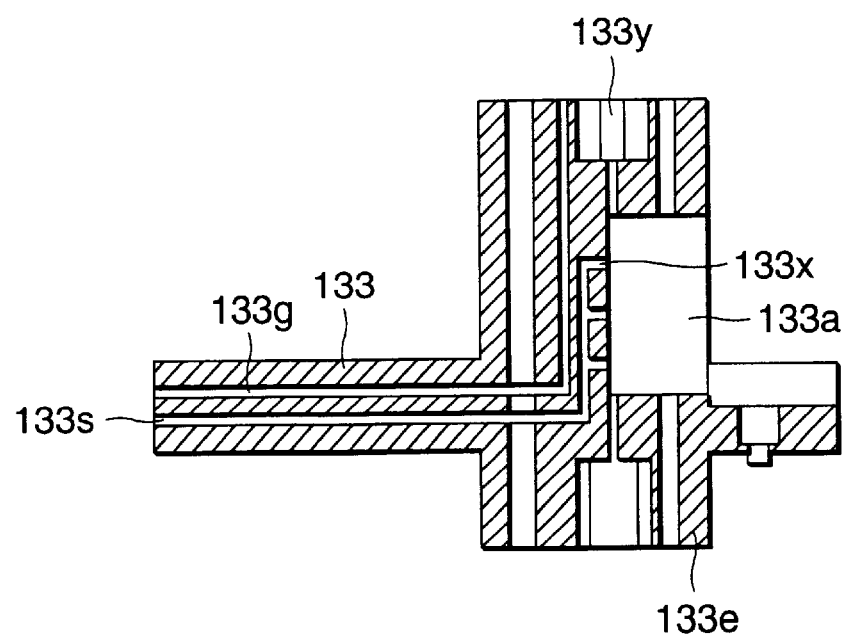
Figure 5:
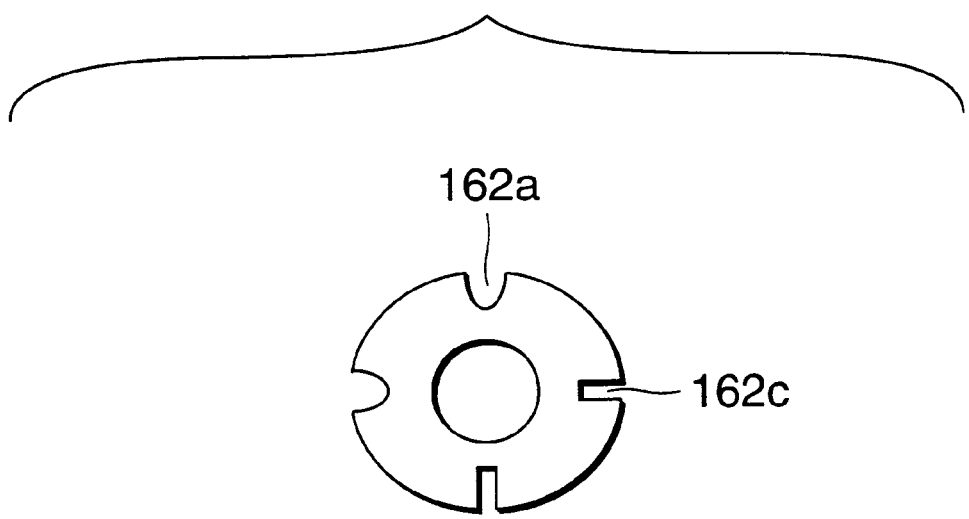
FIG. 5 is a plan view and a cross-sectional view of the electric supply die shown in FIG. 1.
Figure 5:
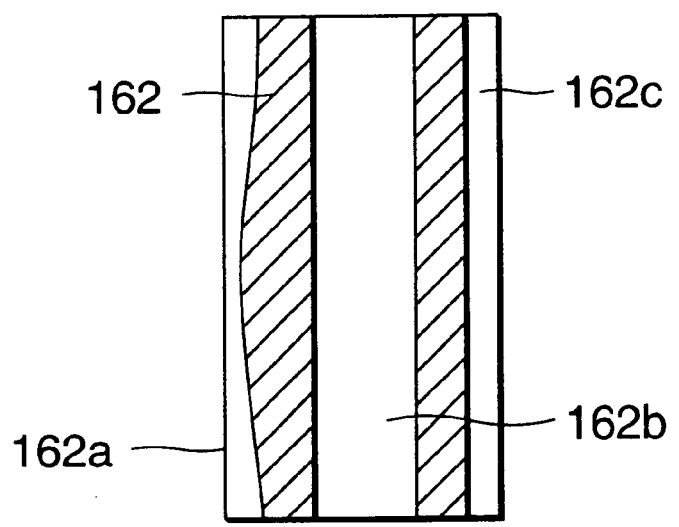
Figure 6:
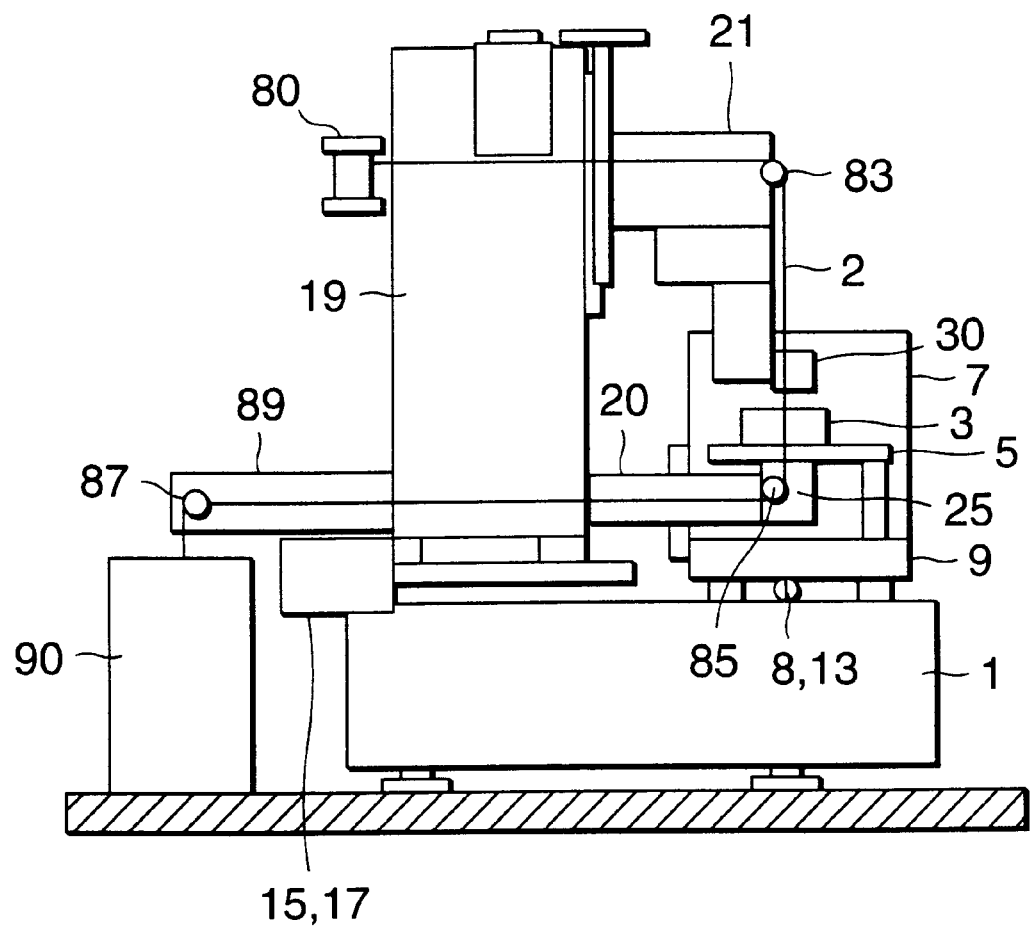
FIG. 6 is a side elevational view of a wire electrical discharge machine.
Figure 7:
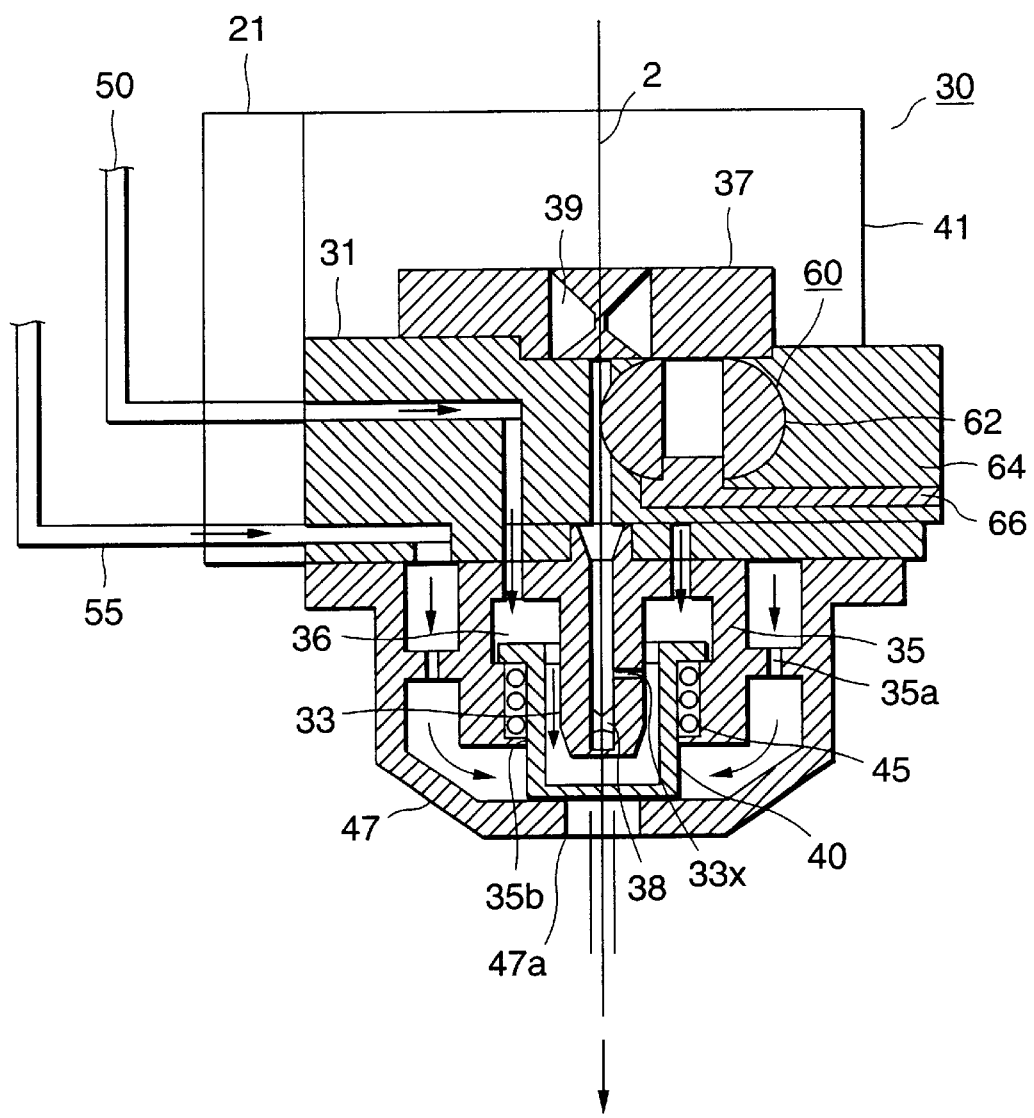
FIG. 7 is a cross-sectional view of a conventional upper wire guide.

Referring to FIGS. 1 to 5, a description will be given of an embodiment of the present invention. FIG. 1 is a cross-sectional view of an upper wire guide according to an embodiment of the invention; FIG. 2 is a cross-sectional view, taken along line II—II in the direction of arrows, of an electric supply die and a guide body portion shown in FIG. 1; FIG. 3 is a cross-sectional view of a jet nozzle shown in FIG. 1; FIG. 4 is a perspective view and a cross-sectional view of an electric-supply-die receiving member shown in FIG. 1; and FIG. 5 is a plan view and a cross-sectional view of the electric supply die shown in FIG. 1.

In FIGS. 1 to 5, the upper wire guide is formed by a guide body portion 133 for jetting a working fluid to a workpiece 3 while guiding a wire electrode 2 into a hole 133y formed in its central portion; a substantially cylindrical electric supply die 162 which is engaged in a notched portion 133a of this guide body portion 133; a doughnut-shaped ring 142 which is fixed by a bolt 164 such that this electrical supply die 162 movably engages on the outer side of the guide body portion 133, and that it is difficult for an external force to be applied to the guide body portion 133; an auxiliary guide portion 145 engaged with an inner peripheral surface of a recessed portion of the guide body portion 133 by means of an O-ring; a jet nozzle 140 serving as a water-column generating nozzle which is engaged on an outer peripheral surface of this auxiliary guide portion 145 and is engaged with an inner peripheral surface of the guide body portion 133; and a working fluid nozzle 147 which is covered over this jet nozzle 140.

As shown in FIG. 4, the guide body portion 133 has linear working fluid channels 133b for the working fluid to flow therethrough from a tip portion of the nozzle; a channel 133c for the fluid serving as a driving source for raising and lowering the working fluid nozzle 147; a substantially L-shaped jet channel 133g for allowing the working fluid to flow to the jet nozzle 140; an introducing channel 133s for pressing which serves as a jetting means provided horizontally to press the wire electrode 2 against the electric supply die 162 by means of the working fluid; and a plurality of pressing channels 133x provided vertically for the same purpose. A wire auxiliary guide 39 is fixed in an cylindrical recessed portion of an upper portion of the guide body portion 133, and a projecting portion 133e is engaged and fixed in a recessed portion of a guide attaching plate 131 by means of an O-ring 132.

As shown in FIG. 3, working fluid channels 145g through which the working fluid flows are formed in the auxiliary guide 145, and these working fluid channels 145g are connected to the working fluid channels 133b of the guide body portion 133, an auxiliary wire guide 38 being fixed to a distal end portion of the auxiliary guide 145. An inner peripheral surface of the jet nozzle 140 having a hole 140a in its central portion is fixed to the outer peripheral surface of the auxiliary guide portion 145 by means of an O-ring 103.

As shown in FIG. 5, the electric supply die 162 has a plurality of groove-shaped electric supply portions 162a provided in its periphery for supplying electricity while coming into contact with the wire electrode 2 and for engaging the wire electrode 2. The electric supply die 162 also has a working fluid channel 162b formed in its central portion and connected to the working fluid channel 133b of the guide body portion 133. Rotating grooves 162c are respectively provided on opposite sides of the electric supply portions 162a to rotate the electric supply die 162 from the outside by means of a lever 166.

The working fluid nozzle 147 is formed in such a manner as to be constantly capable of being lifted upward as its collar portion, in which a spring 144 loaded at an upper surface of the ring 142 is engaged in its recessed portion, is retained by a retaining plate 143 serving as a working-fluid nozzle attaching portion. The bottom surface of the retaining plate 143 is fixed to a top surface of the guide body portion 133. The arrangement provided is such that, as the fluid flows through a channel 143c into or out of a sealed space portion 150, i.e., a gap between the retaining plate 143 and the guide body portion 133, the space portion 150 is expanded or contracted to raise or lower the working fluid nozzle 147.

The piping for the working fluid to the jetting means allows the working fluid flowing from a pump 200 to be distributed to the upper and lower wire guides, and is joined from another channel to an inlet of the introducing channel 133s for pressing through a flowrate control valve 202. This flowrate control valve 202 is a valve for setting the volume of flow supplied from the pump 200 to a fixed flow rate or a fixed pressure, and is arranged such that even if the internal pressure of the introducing channel 133s for pressing changes, a fixed volume of flow can be always supplied.

Referring to FIGS. 1 to 5, a description will be given of the wire electrical discharge machine having the above-described construction. First, in a state in which the working fluid nozzle 147 and the jet nozzle 140 have been lowered by contracting the space portion 150 by discharging the fluid in the space portion 150 of an upper wire guide section 30 through the channels 133c and 143c, if the working fluid is supplied to the jet channel 133g, the working fluid flows to the jet channel 145g of the auxiliary guide portion 145, and a jet stream jets out from a jetting hole 147a of the jet nozzle 147 through the gap between a distal end portion of the auxiliary guide portion 145 and the jet nozzle 147. The wire electrode 2 passes through the interior of this jet stream, and the wire electrode 2 is hence guided to a lower wire guide 25 and is connected thereto.

After completion of such a connection, the supply of the working fluid to the jet channel 133g is stopped, the fluid is allowed to flow through the channel 143c in the retaining plate 143 through the channel 133c in the guide body portion 133, and the fluid is supplied to the space portion 150 to expand the same, thereby raising (retracting) the working fluid nozzle 147. The operation then proceeds to processing.

Meanwhile, the wire electrode 2 is energized by the unillustrated power source through the electric supply die 162. At the same time, a large current flows across the contacting portions of the electric supply die 162 and the wire electrode 2, and intense heat is produced therein. The working fluid from a cooling hole 145x causes the back pressure inside the working fluid nozzle 147 to rise, and is supplied to the wire passage 133y, thereby cooling contacting portions of the electric supply die 162 and the wire electrode 2.

In addition, the working fluid, after flowing from the pump 200 through the flowrate control valve 202, passes through the plurality of pressing channels 133x via the introducing channel 133s for pressing provided in the electric supply die 162, and presses the back of the wire electrode 2. Consequently, the working fluid absorbs Joule heat produced in the contacting portions, and processing is continued while maintaining the contacting portions at a substantially fixed temperature. It should be noted that the electric supply die in the lower guide is also cooled by similar action.

According to the above-described embodiment, even if the gap between the nozzle and the workpiece becomes large, and the internal back pressure of the nozzle is lowered, it is possible to ameliorate the contacting condition without increasing the mechanical contacting and frictional resistance. Hence, it is possible to alleviate the wear of the wire electrode 2 by suppressing the vibration of the wire electrode 2.

In addition, even if the amount of the working fluid supplied in the channel 133s is lowered, the working fluid of a fixed flow rate or pressure is supplied from the channels 133x by means of the flowrate control valve 202, so that the surface of the wire electrode 2 is pressed to be brought into contact with the electric supply die.

It should be noted that the cooling hole 145x for cooling the electric supply die by the working fluid may be disused by virtue of the above-described arrangement.

As described above, according to the invention, there is provided a wire electrical discharge machine including a wire electrode for processing a workpiece while causing electrical discharge to take place with a working fluid interposed between the wire electrode and the workpiece, and an upper wire guide and a lower wire guide through which the wire electrode is passed and which have therein channels for the working fluid to flow therethrough, characterized by comprising: a working fluid nozzle fixed to the upper wire guide or the lower wire guide and adapted to jet and supply the working fluid toward the workpiece; an electric supply die provided in the working fluid nozzle to energize the wire electrode by coming into contact therewith; a recessed portion for engagement with the wire electrode being provided in a surface of the electric supply die along a moving direction of the wire electrode; and jetting means for jetting the working fluid toward the wire electrode so as to press the wire electrode against the electric supply die. Accordingly, an advantage can be obtained in that the contacting portions of the electric supply die and the wire electrode can be cooled sufficiently while causing the wire electrode to travel smoothly.

What is claimed is:
1. A wire electrical discharge machine comprising:
 a wire electrode for processing a workpiece while causing electrical discharge to take place with a working fluid interposed between said wire electrode and said workpiece;

an upper wire guide and a lower wire guide through which said wire electrode is passed and which have therein channels for the working fluid to flow therethrough;

a working fluid nozzle fixed to said upper wire guide or said lower wire guide and adapted to jet and supply the working fluid toward said workpiece;

an electric supply die provided in said working fluid nozzle to energize said wire electrode by coming into contact therewith;

a recessed portion for engagement with said wire electrode being provided in a surface of said electric supply die along a moving direction of said wire electrode; and a plurality of jetting ports for jetting the working fluid toward said wire electrode so as to press said wire electrode against said electric supply die.

2. A wire electrical discharge machine comprising:

a wire electrode for processing a workpiece while causing electrical discharge to take place with a working fluid interposed between said wire electrode and said workpiece;

an upper wire guide and a lower wire guide through which said wire electrode is passed and which have therein channels for the working fluid to flow therethrough;

a working fluid nozzle fixed to said upper wire guide or said lower wire guide and adapted to jet and supply the working fluid toward said workpiece;

an electric supply die provided in said working fluid nozzle to energize said wire electrode by coming into contact therewith;

a recessed portion for engagement with said wire electrode being provided in a surface of said electric supply die along a moving direction of said wire electrode;

jetting means for jetting the working fluid toward said wire electrode so as to press said wire electrode against said electric supply die; and control valve means for setting a pressure or a flow rate of the working fluid jetted by said jetting means to a fixed level.

* * * * *